Aug. 28, 1962 TATSUO KOBAYASHI 3,051,065
LENS SHUTTER FOR CAMERA
Filed Dec. 3, 1959
9 Sheets-Sheet 1
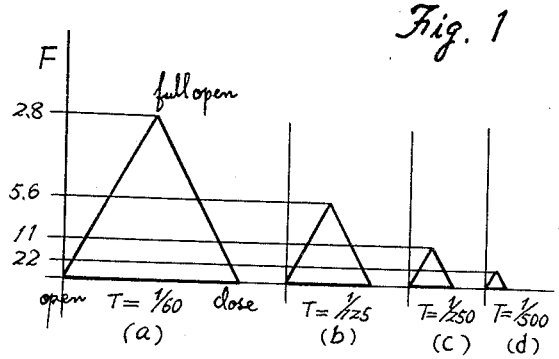
Fig. 1
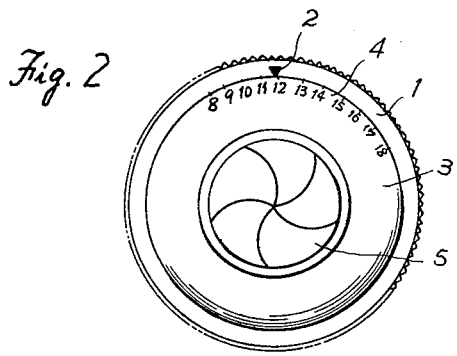
Fig. 2
Fig. 3
| LV F | 9 | 10 | 11 | 12 | 13 | 14 | 15 | 16 | 17 | 18 |
|---|---|---|---|---|---|---|---|---|---|---|
| 2.8 | 1/60 | 1/125 | 1/250 | 1/500 | | | | | | |
| 4 | | 1/60 | 1/125 | 1/250 | 1/500 | | | | | |
| 5.6 | | | 1/60 | 1/125 | 1/250 | 1/500 | | | | |
| 8 | | | | 1/60 | 1/125 | 1/250 | 1/500 | | | |
| 11 | | | | | 1/60 | 1/125 | 1/250 | 1/500 | | |
| 16 | | T (sec) | | | | 1/60 | 1/125 | 1/250 | 1/500 | |
| 22 | | | | | | | 1/60 | 1/125 | 1/250 | 1/500 |

Aug. 28, 1962   TATSUO KOBAYASHI   3,051,065
LENS SHUTTER FOR CAMERA
Filed Dec. 3, 1959   9 Sheets-Sheet 2

Aug. 28, 1962

TATSUO KOBAYASHI 3,051,065

LENS SHUTTER FOR CAMERA

Filed Dec. 3, 1959

Aug. 28, 1962   TATSUO KOBAYASHI   3,051,065
LENS SHUTTER FOR CAMERA
Filed Dec. 3, 1959   9 Sheets-Sheet 8

United States Patent Office 3,051,065
Patented Aug. 28, 1962

3,051,065
LENS SHUTTER FOR CAMERA
Tatsuo Kobayashi, Amagasaki City, Japan, assignor to Chiyoda Kogaku Seiko Kabushiki Kaisha, Osaka City, Japan, a corporation of Japan
Filed Dec. 3, 1959, Ser. No. 857,064
Claims priority, application Japan Dec. 5, 1958
6 Claims. (Cl. 95—10)

This invention relates to a lens shutter for a camera of the type having only shutter blades and no independently operable device, apertures of said blades being variable, wherein the control of exposure is effected in changing the aperture of shutter blades by actuating the only actuating member from outside for the control of the amount of exposure under a constant driving force of the main driving device.

In general, lens shutters of simplified operation operate under a constant shutter-aperture, that is, they have no iris device. Shutters having only a control device for exposure times or those having constant exposure times and variable shutter devices have heretofore been used. These shutters, however, have necessarily narrow ranges of control. This is so because if the amount of exposure is considered in numerical values as changing in algebraic progression, such as light values (LV), the exposure times from 1 to $\frac{1}{500}$ sec. and the shutter apertures from 18 to 1.5 have 10 steps or 8 steps of control range respectively. As a result high class shutters having both control ranges must have control ranges of 17 steps. Therefore in case either exposure time or aperture is controlled, the resulting ranges become 10 steps and 8 steps respectively. Generally shutters having ten steps of control are of exceedingly high price. In cheap shutters, 2 or 3 steps of control can at most be provided. Special shutter blades are required if a further range of control is desired. If both exposure times and exposure apertures are controlled independently, the operation will necessarily become intricate. In such arrangements, two control mechanisms are operated simultaneously, and automatic control of exposure by virtue of interlocking with an exposure meter requires complex cams, differential gears and the like, resulting in the disadvantage of high price. If an exposure control of low cost and a considerably wide range of control is desired, it is usual to vary only the aperture of the shutter, with exposure times held constant. Such construction is frequently observed in 8 millimeter cinema photographing cameras or the cheapest cameras with an interlocked exposure meter, and is well known.

In concluding what has been stated above, it may be said that usual high class lens shutters having controlling means for exposure times as well as diaphragm-controlling means possess a wide controlling range for exposure. However, as their constructions are complex and necessarily of high price, and as they have two actuating members, various high grade photographing techniques can be performed thereby. On the other hand, the determination and control of adequate exposure take an extended period of time, mistakes are likely to occur and the interlocking of both control means is quite difficult. Lens shutters having either the time-controlling means or the diaphragm means are, on the contrary, of relatively low cost and easy to interlock with an exposure meter, but have the disadvantage of a narrow control range for exposure.

The feature of my invention lies in a lens shutter wherein the aforementioned disadvantages of usual lens shutters are eliminated and additional advantages are introduced. The lens shutter of my invention has a wide control range of exposure which is comparable to that of a high class shutter. Moreover, in case the control of exposure is to be effected from outside, another feature of the invention lies also in that as only one actuating member is needed, interlocking with an exposure meter is easy, and in addition, the fabrication thereof is of low cost.

Though in fact various constructions may be considered in order to give effect to the foregoing conclusions, this is accomplished very easily according to the present invention. Particular descriptions of the invention will now be given.

To and fro movable blade type lens shutters of a construction having no diaphragm, the shutter blades of which actuate the control of exposure times and also act as a diaphragm are well known. See Patent No. 761,756 to Brueck.

To illustrate the fundamental ideal of the present invention, suppose that the actuation of a to-and-fro movable blade type of lens shutter is effected linearly. The blades are full open for F2.8, and T $\frac{1}{60}$ sec. at a 50% efficiency. Furthermore, the aperture formed by the blades is gradually limited, where if the velocity of movement of blades is held constant, the exposure time is decreased with the aperture of blades becoming small. Thus, the effective diameter of the aperture formed by the shutter blades is necessarily limited. The exposure decreases gradually. Since the effective shutter diameter decreases theoretically to a half of the initial value for each two steps of control effected, it is obvious that the lens shutter of such a blade movement decreases the exposure times to its half each two steps of shutter aperture, provided that the said aperture decreases corresponding to the two steps of shutter aperture. Accordingly, for instance, $\frac{1}{25}$ sec. corresponds to F5.6; $\frac{1}{250}$ sec. corresponds to F11; and F22 corresponds to $\frac{1}{500}$ sec. In the intermediate values of shutter apertures, the amount of exposure of course decreases continuously. Accordingly, shutters of such a construction can control a wide range of exposure from 9 to 18 light value (LV) by merely changing the opening of blades. Moreover, in intermediate stages of control, an optimum combination of time and aperture (or diameter) can automatically be chosen; that is, an exposure condition combining a shutter aperture being not excessively small with an exposure time being not excessively long. Furthermore, as in this shutter, the main actuating force is constant and no throw governor is provided, the price is naturally low. In addition, as there is only one actuating member, not only is operation of the shutter obviously facilitated with reduced possibility of error in operation but also the interlocking with an exposure meter becomes extraordinarily easy.

Furthermore, when it is desired to effect a wide range of exposure control, the shutter may be so constructed that a throw-governor is operated in the full open condition of sectors, i.e. at a condition corresponding to F2.8, and operation of said governor is appropriately controlled. In such a case, for instance, even required where a shutter velocity of up to 1 second is required, the range of control by said governor amounts only to 1 to $\frac{1}{30}$ sec., namely, said range shows a decrease to a half, as compared with the usual shutters having a control range of 1 to $\frac{1}{500}$ sec. necessitating a control of 1 to $\frac{1}{250}$ sec. Therefore, it is quite evident that the construction of this governor will become extremely simple. A shutter according to my invention, has a control range similar to the case of the combination of $T=1$ to $\frac{1}{500}$ sec. and F2.8 to 22, a far simpler construction and only one actuation results in low cost and a high capability.

This invention is based on the theory set forth above. In short exposure times, according to the invention the relative position between the shutter blade actuating pin and the revolving spindle for the shutter blade is so altered as to increase overlap of the blades for controlling exposure times. A super high speed controlling member is connected with a revolving member on which each blade is mounted either directly or through a suitable connecting member. A super high velocity exposure time control can be effected according to the invention by changing the position of a super high speed controlling device. Such a construction is described in copending U.S. patent application Serial No. 750,428, filed by the present applicant July 23, 1958.

According to the present invention, the camera has an objective opening of constant diameter, and has no independent diaphragm, but a suitable number of shutter blades are so pivoted as to be opened by movement in one direction and closed by reverse movement, whereby the amount of exposure is controlled by varying the operational angle in shifting the relative position in closed position between the shutter blade actuating pins and the revolving spindle for shutter blades when it is intended to reduce the exposure so that the overlap of the shutter blades may be increased. Thus when the main actuating means have a constant effective strength, if one exposure value is chosen, a certain shutter aperture and exposure time are fixed. An actuating member is provided for controlling the desired exposure from outside of the camera. Accordingly, provided that the lens shutter is so designed that the time required for opening the shutter blades is approximately equal to or larger than the required time lag of a flash bulb, desired flash-synchronized photographing can be effected, by easily synchronizing the flash of a flash bulb of the M-class, with the full opened position of shutter blades of the shutter. This is effected by provision of a contact point of simple construction analogous to a device for the X-contact point in usual shutters in which the motion of a shutter blade, or a member moving in connection therewith, is utilized, without an independent lag device for the flash bulb synchronizing means.

Shutters of usual size, namely shutters of sizes No. 00 or No. 0, are provided with ordinary principal springs of usual strength for their main driving means. The effective exposure times, when the opening and closing actuation are effected in the normal condition, i.e. in the free condition where no decelerating means are used (generally the highest exposure at each shutter), are $1/200$ to $1/500$ sec., i.e. 5 to 2 ms.; the time required for the opening of shutter blades, assuming the efficiency at 50%, is only around 5 to 2 ms. However, as is well-known, the time-lag of flash bulbs of the M-class is of the order of 20 ms. Therefore, in this case, at least 20 ms. is required for the opening procedure as its efficiency is assumed to be 50%. The synchronizing between the flash of an M-class flash bulb and the full-open position of the shutter is apparently impossible with the main driving means as referred to above.

Notwithstanding the synchronizing with a flash bulb, for instance, when the present shutter is used with a lens of F2.8 in the normal exposure condition is $1/200$ to $1/500$ sec., the shutter aperture becomes smaller than this and the shutter speed becomes faster with the overlap of blades getting deeper. Therefore, in this combination of shutter elements, the velocity will be $1/500$ sec. (LV 12) at F2.8; $1/1000$ sec. (LV 1.5) at F.5.6 and $1/200$ sec. (LV 18) at F8. As compared with the light values (LV) generally used, LV values are likely to be too large. Therefore, the standard exposure times are preferably chosen at about $1/30$ to $1/60$ sec.

According to the invention, various means are employed to realize the above mentioned conditions. First, if the main spring is chosen to be weaker, the time required to open or close the aperture formed by the blades will be longer. In order to increase the exposure time to about double this time length, the strength of the main spring is required to be $1/2$. If the strength of the main spring is varied according to the above rate, a main spring of strength about $1/64$ that of the main spring of $1/500$ sec. shutter has to be used. In springs of such strength, the effect of the weight of frictional parts in every mechanism, unbalance of all parts, etc. becomes extremely high; and in fact such weak springs are not usable even experimentally, and of course, are not suitable for practical purposes. Therefore, it is difficult to accomplish the purpose of this invention, namely to provide for synchronizing with a flash bulb and the selection of standard exposure times at about $1/30$ to $1/60$, by merely choosing a weak main spring.

As a result of investigation of the above-mentioned matters it has been found that, in the present invention, the main spring for the main actuating means can be kept at a strength sufficient to stabilize operation of the exposure. Furthermore, to accomplish this purpose, an appropriate brake may be caused to engage a member operating with the opening and closing movements of the shutter blades and thus be adapted to control operation of the shutter blades by controlling their actuating member.

Furthermore, in case an X-contact point is necessary for the flash bulb-synchronizing, a well-known switching device can be used which is provided with an appropriate contact system.

Additional features and advantages of this invention will be apparent from the following detailed description of an embodiment of the invention with reference to the accompanying drawings, in which FIG. 1 is a diagram of the relationship between the aperture formed by the shutter blades and the exposure;

FIG. 2 is a front view of a lens shutter according to this invention;

FIG. 3 is a table showing the relationship between the light value, shutter apertures and exposure times;

Figure 4:
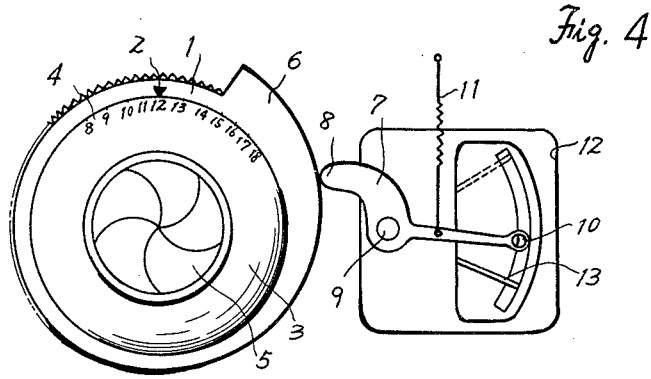
FIG. 4 is a front view of the lens shutter shown in FIG. 2 which is interlocked with an exposure meter.

In the drawings, FIG. 1 is a diagram showing the relation between the shutter aperture and the amount of exposure, which serves to explain the present invention. This is based on the assumption that operation of the shutter blades is effected linearly in the well-known blade-returnable lens shutter. Accordingly, for F2.8 the blade aperture is set at full open position $T=1/60$ and the efficiency being assumed to be 50%, the blade operation is as shown under ($a$). The aperture of the shutter blades is gradually limited, whereby, if the velocity of the shutter blade operation is invariable, the exposure times decrease as the aperture becomes smaller, and accordingly, the effective shutter diameter is limited, the amount of exposure decreasing consecutively as shown under (b), (c) and (d).

FIG. 2 illustrates a shutter according to the invention. Here an actuating member 1 is provided for controlling the exposure. An indicator pointer 2 is provided on the actuating member 1 for registering with a scale 4 on a surface plate 3. Shutter blades 5 have an additional function as a diaphragm. The scale numerals 4 are not limited to LV. A series of appropriate numerals, words or symbols can of course be used. When a lens shutter is interlocked with an exposure meter, the scale can of course be eliminated.

In the following, my invention will be more fully outlined. Before entering the conceptive explanation of the present invention, the exposure (or light value) control operation of usual shutter mechanisms is reconsidered as below, wherein f-values (or diaphragm opening) and shutter speeds can be controlled separately.

The relationship between the shutter aperture F and exposure times T, wherein the exposure is expressed in light value (LV), is as shown in the table given in FIG. 3 with respect to lens shutters (combined with an F2.8 lens) capable of changing the control range of exposure times of 1/60 to 1/500 sec. and shutter-aperture control of F2.8 to 22 and exposure times independently.

The following will be apparent from the above table, the first six items being general and relating to usual shutters:

(1) When the object to be photographed has a brightness corresponding, for instance, to LV 13, the following four combinations are possible: F4 and 1/500 sec.; F5.6 and 1/250 sec.; F8 and 1/125 sec.; and F11 and 1/60 sec.

(2) Four combinations can be used only when the brightness, or LV of the object equals 12, 13, 14 or 15. If the object to be photographed has a brightness of more or less than these four LV values, only combinations decreasing gradually in number can be used.

(3) When the object to be photographed is dark and the exposure amount is required to be kept at its highest value, only the combinations of $F=2.8$ and $T=1/60$ sec. can be used.

(4) When the object is bright and the amount of exposure is required to be kept at the minimum, only the combination of $F=22$ and $T=1/500$ sec. can be used.

(5) All 10 steps of control can be obtained, that is to say from LV 9 to LV 18. However, four combinations of F and T can only be used for LV 12 to LV 15 and only one combination can be used at both extremities, that is for LV 9 or LV 18.

(6) Also in the case described under item (1), all combinations may be satisfactorily used for an ordinary object to be photographed. The combination: F4 and T 1/500 can resist satisfactorily shaking of the camera, but the depth of the object is so small as to be likely to bring the object out of focus. In the case with F1 and T 1/60 sec., the likelihood of being out of focus decreases, but such a shutter can not resist well the shaking of the camera.

The foregoing descriptions, items (1) to (6), relate to the actual exposure control (or LV control) for usual shutter mechanisms. However, the following conclusions have been reached by a closer consideration of such shutters and simplification of control operations.

(7) Generally, for the reason referred to under item (6), it will be safe to choose a combination of, say, F8 and 1/125 sec. or F5.6 and 1/250 sec. or thereabout.

(8) Generally, for the same reason, there would usually be no harm in selecting only one combination of an adequate exposure and time of shutter for each respective light value. It is rather advantageous to choose but one combination, because this can eliminate the trouble of selection and reduce errors in operation.

FIG. 4 represents one example of the shutter shown in FIG. 2, which is interlocked with an exposure meter. A lever 7 is pulled by a spring 11 anticlockwise so as to keep one end 8 of said lever 7 always in contact with a cam 6 formed on one part of the actuating member. The lever 7 has a pointer 10 which registers with a scale on the dial of an exposure meter with a needle point thereof. The lever 7 is journalled on the camera proper or the shutter (not illustrated), by means of spindle 9, whereby the pointer 10 is designed to move within the operation range of the pointer 13 of the exposure meter 12 appropriately positioned. Now, as the actuation member 1 is moved, the lever 7 is operated by the cam 6, and the pointer 10 of said lever 7 is caused to coincide with pointer 13 of the appropriate meter 12. Provided that the relation between the oscillation of the meter and control of the amount of exposure of shutter by actuating member 1 is appropriately designed, an extremely easy interlocking can be obviously obtained between the exposure meter and shutter.

Figure 5:
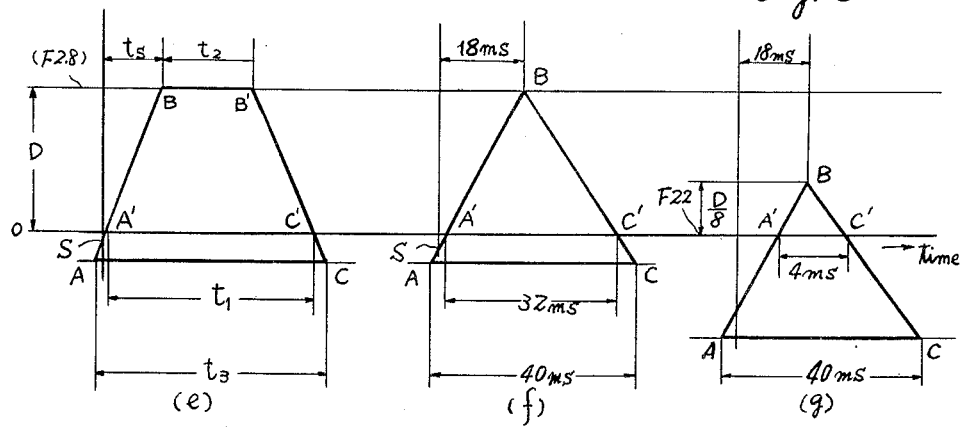
FIG. 5 is a diagram showing the relation between the area of the shutter aperture and the shutter time, which serves to explain the embodiment of this invention shown in FIG. 6.

FIG. 5 is a fundamental diagram showing the relation between the cross sectional area of shutter aperture and the time, which constitute the present invention. The part (e) of this diagram represents a case wherein the governor is engaged at the maximum aperture opened by the blades, and the normal condition where lag of movement of the blades is the minimum. The blades being to move from A and the aperture begins to form at A' and reaches to the full open position at B. The full open state is continued by the governor until B' is reached. The shutter then begins to close from the point B' and the aperture is entirely closed at C'. The blades then come to rest at C. The contact point for synchronizing the flash bulb therewith is at a point S between the beginning of the movement and the opening of the shutter blades. The flash bulb is switched into circuit by moving a part of the main driving means through a blade-actuating ring or the blades themselves. Assuming that a linear graph is obtained, the effective time of exposure T is expressed as below;

$$T = \frac{1}{2}(A'C' + BB') = \frac{1}{2}(t_1 + t_2)$$

The time-lag for the flash-bulb synchronization is given by $t_3$. Further, the time required by the total operation of shutter blades is also given by $t_3$.

(f) represents a case wherein the governor is operated in the normal condition. In this invention, it is preferable to have BB' become smaller, and in fact, the shutter can be so designed and fabricated that BB' equals zero. Therefore, in this case, BB' is assumed to be zero, as shown by B. (g) represents a case wherein the overlap of the blades when at rest is large; and it is assumed that the diagram (f) can be applied as shifted but otherwise not changed.

In the example just referred to of an embodiment of this invention, the relationships between the exposure amount, i.e. LV, shutter speeds and f-values, are tabulated in Table 1, as follows:

Table 1

| F \ LV | 8 | 9 | 10 | 11 | 12 | 13 | 14 | 15 | 16 | 17 | 18 |
|---|---|---|---|---|---|---|---|---|---|---|---|
| | | | | | T (Sec.) | | | | | | |
| 2.8 | 1/30 | 1/60 | | | | | | | | | |
| 3.6 | | | 1/60 | | | | | | | | |
| 4.5 | | | | 1/100 | | | | | | | |
| 5.6 | | | | | 1/125 | | | | | | |
| 7.2 | | | | | | 1/160 | | | | | |
| 8.9 | | | | | | | 1/200 | | | | |
| 11 | | | | | | | | 1/250 | | | |
| 14 | | | | | | | | | 1/320 | | |
| 18 | | | | | | | | | | 1/400 | |
| 22 | | | | | | | | | | | 1/500 |

The following may be stated regarding the quantities given in Table 1: Strictly speaking, T should follow a $\frac{1}{2}^n$-series. For instance, when $n=6$, T becomes 1/64 and is conventionally expressed as 1/60. On the other hand, F should follow a $\sqrt{2^m}$-series. When $m=3$, F becomes 2.828 . . ., which is conventionally expressed as 2.8. For instance, for LV 10: $T=\frac{1}{2}^n$ (where $n=6 1/3$) $\doteq \frac{1}{80}$ and $F=\sqrt{2^m}$ (where $m=3 2/3$) $\doteq 3.6$.

Moreover, in FIG. 5, (e) represents LV 8, (f) represents LV 9 and (g) represents LV 18.

In those shutters having the construction referred to above, if as shown in FIG. 5—(f), for instance, the opening ratio of the lens to the maximum aperture of shutter blades, i.e. the aperture diameter, is taken as F2.8, in which the governor is not engaged, the time required for the entire operation of shutter blades is 40 ms., the velocity of movement of the shutter blades being constant and the efficiency being 50%, the contact point for the flash bulb synchronization begins to work at 20 ms., from the commencement of shutter blades operation and the aperture begins to form after 4 ms. Then, the effective exposure time is 16 ms., that is, about 1/60 second. In this case, the amount of exposure apparently corresponds to LV 9, a combination of F2.8 and 1/60 second. Now when the overlap of shutter blades is gradually increased by revolving the exposure controlling plate and when the exposure operation is effected in that condition, the maximum diameter of the aperture becomes small and the exposure time short, as already described. Assuming that the diagram (f) shifts as it is, and then assuming a condition, wherein, for instance, the maximum diameter of aperture corresponds to F22, the effective exposure time becomes 2 ms., i.e. about 1/500 second as shown in FIG. 5—(g). The LV in this case corresponds to 18. Thus, though the effective angle decreases, the time required by the shutter blades for the complete operation does not change, and also the time lag from the flash bulb synchronization contact point commencing to work to the maximum aperture of the shutter blades does not vary. Accordingly, the synchronizing bulb always works perfectly. (In this example, as the time-lag is 18 ms., the bulb is M-class.)

In the foregoing description, a considerable amount of assumption has been made with respect to operation of the shutter blades for facilitating understanding. Actually, however, as the operation of shutter blades does not proceed linearly as shown in FIG. 5, due to the change in the main driving force and the mass and frictional resistance of the shutter blades, etc., those effects should of course be considered. However, such effects are not generally different from the above-mentioned assumption. In short, though in the present invention no independent shutter-aperture device is provided, the constant effective strength of the main actuating means can be utilized as such device in the above-mentioned example, by merely changing the overlap of the shutter blades by operation of an exposure controlling plate. In other words, the only actuating member for controlling exposure is the exposure controlling plate, said wide range of exposure control being 10 steps of control from the first combination of F2.8 with 1/60, i.e. LV 9 to the tenth combination of F22 with 1/500 sec. i.e. LV 22. The relationship between LV, T and F values is as shown in Table 2.

Table 2

| F\LV | 9 | 10 | 11 | 12 | 13 | 14 | 15 | 16 | 17 | 18 |
|---|---|---|---|---|---|---|---|---|---|---|
| | T (Sec.) | | | | | | | | | |
| 2.8 | 1/60 | | | | | | | | | |
| 3.6 | | 1/80 | | | | | | | | |
| 4.5 | | | 1/100 | | | | | | | |
| 5.6 | | | | 1/125 | | | | | | |
| 7.2 | | | | | 1/160 | | | | | |
| 8.9 | | | | | | 1/200 | | | | |
| 11 | | | | | | | 1/250 | | | |
| 14 | | | | | | | | 1/330 | | |
| 18 | | | | | | | | | 1/400 | |
| 22 | | | | | | | | | | 1/500 |

Nevertheless by choosing the time required for operation from the beginning of the movement to the full open position of the shutter blades somewhat larger, correspondingly to the time-lag of the desired flash bulb, and a contact point mechanism associating directly with the main driving means, provision is made for rendering the time from the switching-in of said contact mechanism to the full open position to coincide with the time-lag of the flash bulb. A perfect flash bulb synchronization can thus be effected against all exposure values, without the provision of any particular decelerating mechanism for flash bulb synchronization.

Table 3

| F\LV | 3 | 4 | 5 | 6 | 7 | 8 | 9 | 10 | 11 | 12 |
|---|---|---|---|---|---|---|---|---|---|---|
| | T (Sec.) | | | | | | | | | |
| 2.8 | 1 | 1/2 | 1/4 | 1/8 | 1/15 | 1/30 | 1/60 | | | |
| 3.6 | | | | | | | | 1/80 | | |
| 4.5 | | | | | | | | | 1/100 | |
| 5.6 | | | | | | | | | | 1/125 |

The control in the oblique-line area is effected only by varying the over-lapping of blades corresponding to the relationship between LV, T and F values as shown in Table 2.

As illustrated in the operational graph (e) of FIG. 5, at the approximate maximum aperture of the shutter blades, a deceleration device of well-known gear type is engaged with the main driving means, or blade actuating ring. Moreover, its engaging amount is controlled by the cam provided on the exposure controlling plate. Then an exposure-controlling member operable from outside of the camera can provide a wider range of the exposure control. Furthermore, in usual shutters having a controlling range, for instance of 1 to 1/500 sec., the governor can control usually from 1/250 to 1 sec., i.e. 9 steps of control. In the shutter shown, by way of example, for the explanation of my invention, governors capable of controlling 1 to 1/30 sec. of shutter times, i.e. 6 steps of controlling can be employed satisfactorily. In other words, the governor itself is necessarily of an extremely simple construction.

Thus, the mechanism according to this invention has neither independent diaphragm nor governor, or has only an extremely simple governor, and still possesses a range of exposure control which is equivalent to those of the governors of usual shutters having a complex governor in addition for the control of the usual diaphragm and exposure times, wherein though any suitable combination of exposure times and exposure diameter can be obtained. Since the invention provides a combination of exposure diameters and times, which is suitable for ordinary photographing purposes, and since there is only one actuating member for controlling the exposure, the operation is remarkably simple. Accordingly, operational mistakes will be rare, and further, though no particular decelerating means for flash bulb synchronization is provided, flash bulbs can be perfectly and automatically synchronized with all exposure values. Thus, a high capacity shutter can be obtained, despite a very simple construction. The invention, therefore, has great utility.

In the case of the relationship between LV, F and T, as shown in Table 1 and Table 2 being to satisfy, the shape of the cam groove may be so chosen that the control pin 76 (FIGS. 10 to 13) of the governor 75 may be guided by the cam part 21″ when the pointer 37 points at LV-graduation 9 (FIG. 7), while the control pin 76 may be guided by the cam part 21' when the pointer 37 points at LV graduation 8 or lower LV value 5. Accordingly, the first LV value bringing the governor into operation condition by means of the cam 21 is 8 and the shutter time is then 1/30 second and the diaphragm aperture is 2.8. Further it will be apparent that above LV 9 the governor is always inoperative. Thus, the cam surface 23' corresponds to values of LV from 9 to 18 ($T=1/60$ to $1/500$; $F=2.8$ to 22), while the cam surface 23'' corresponds to values of LV from 8 to 3 ($T=1/30$ to 1; $F=2.8$).

Figure 6:
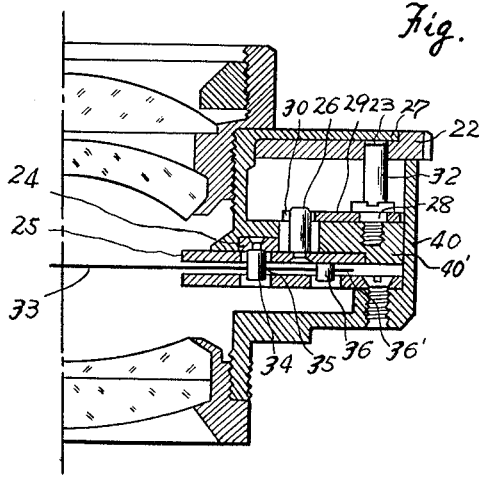
FIG. 6 is a half longitudinal mid-sectional view of the embodiment of this invention illustrated in FIGS. 2 and 4.
Figure 7:
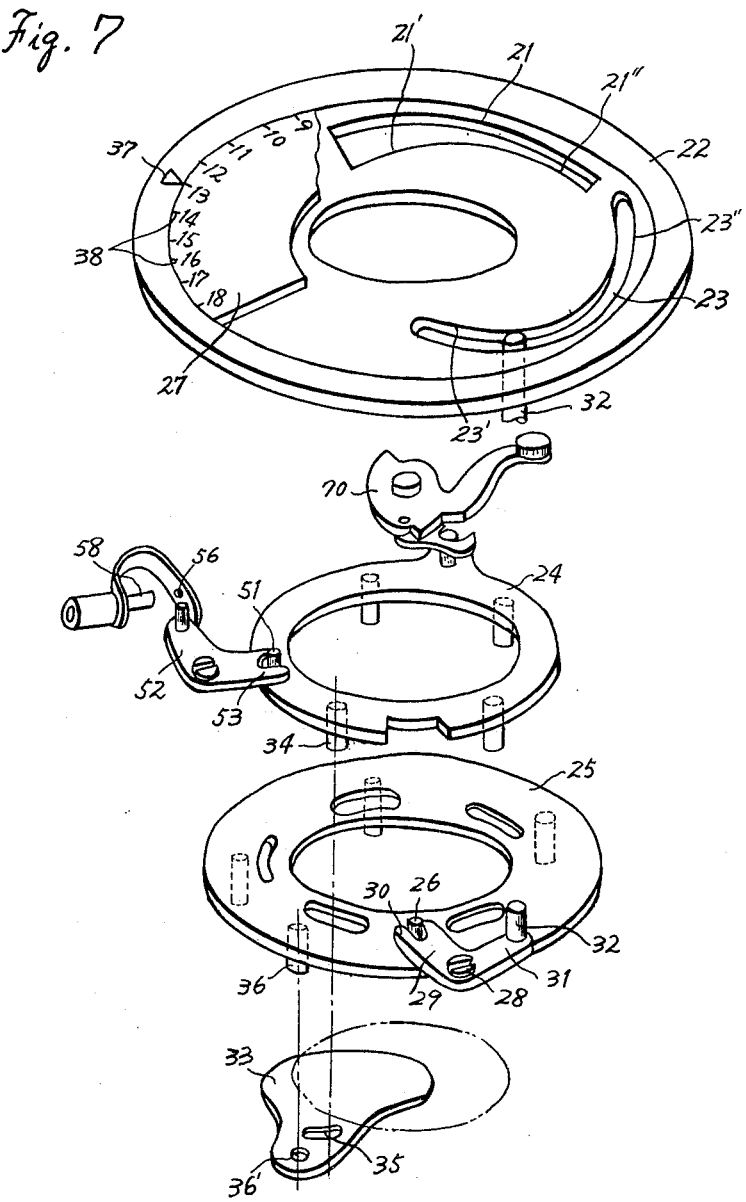
FIG. 7 is an exploded perspective view illustrating the embodiment shown in FIG. 6.
Figure 8:
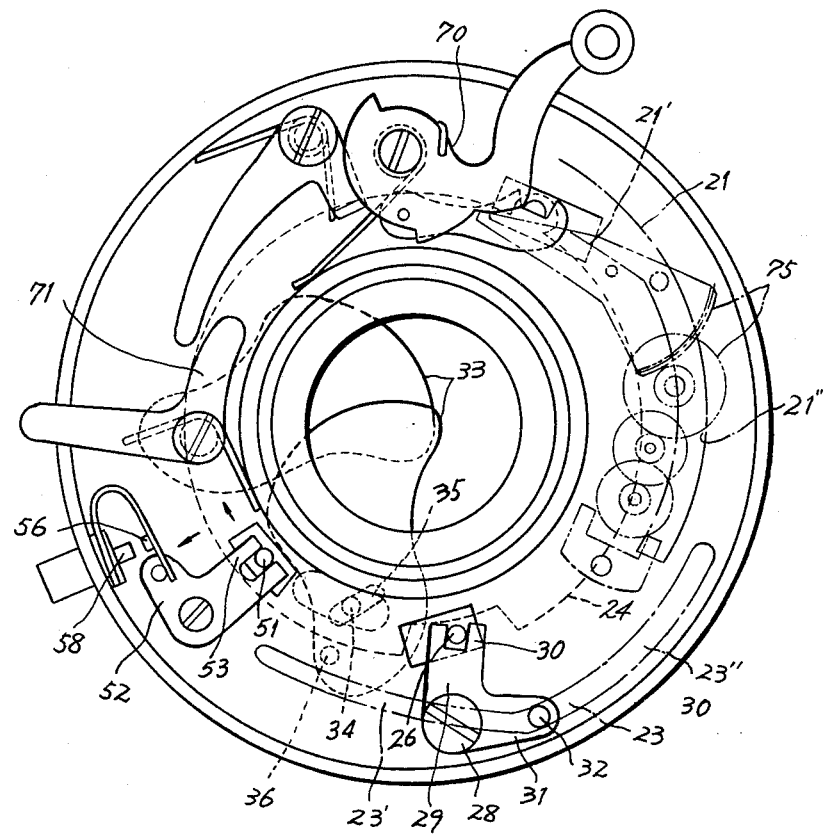
FIG. 8 is a plan view of the embodiment shown in FIG. 6.
Figure 9:
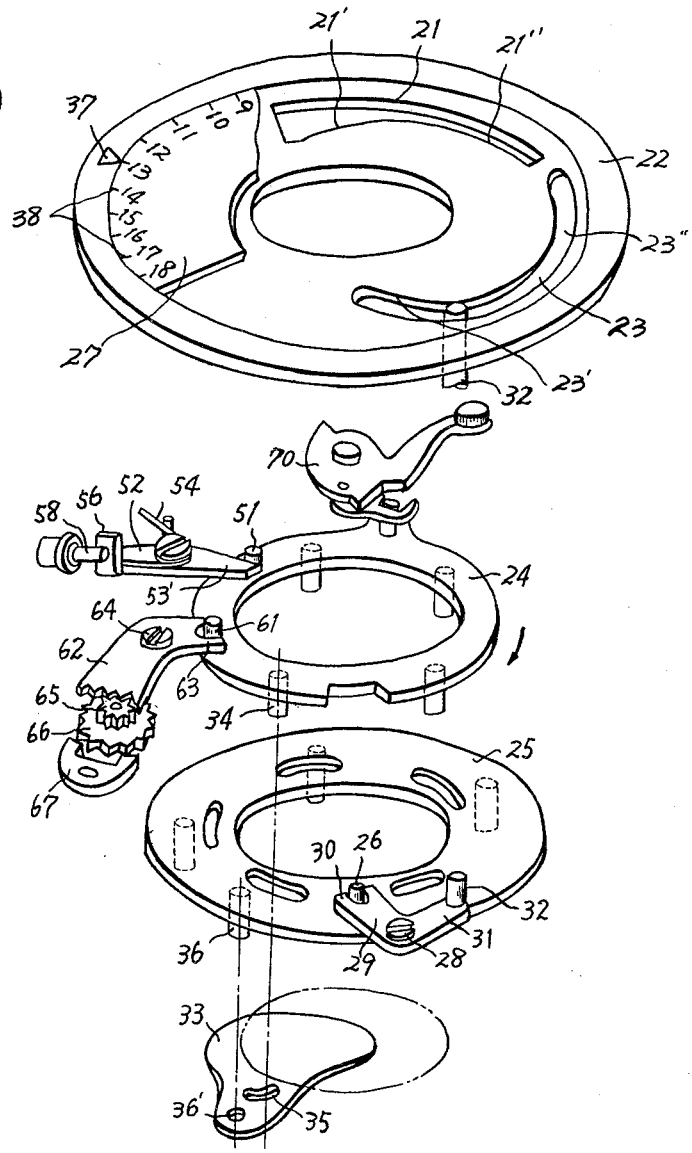
FIG. 9 is an exploded perspective view of the embodiment shown in FIG. 6 showing the lens shutter provided with a brake governor for holding constant the effective strength of the main driving means.
Figure 10:
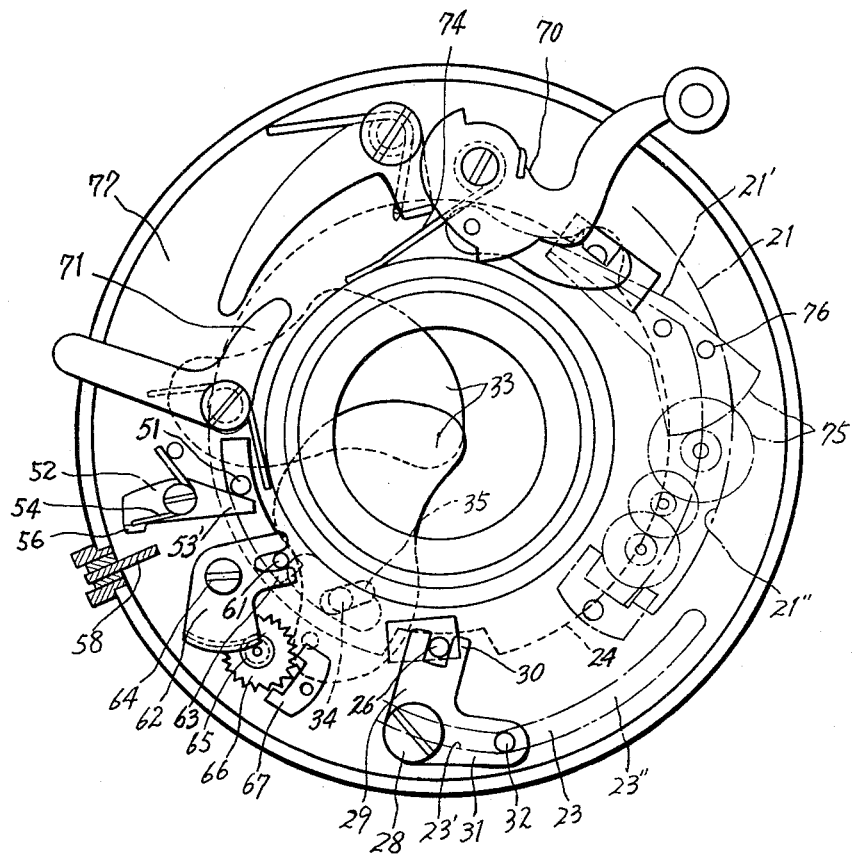
FIG. 10 is a plan view of the embodiment shown in FIG. 9, with the shutter closed.
Figure 11:
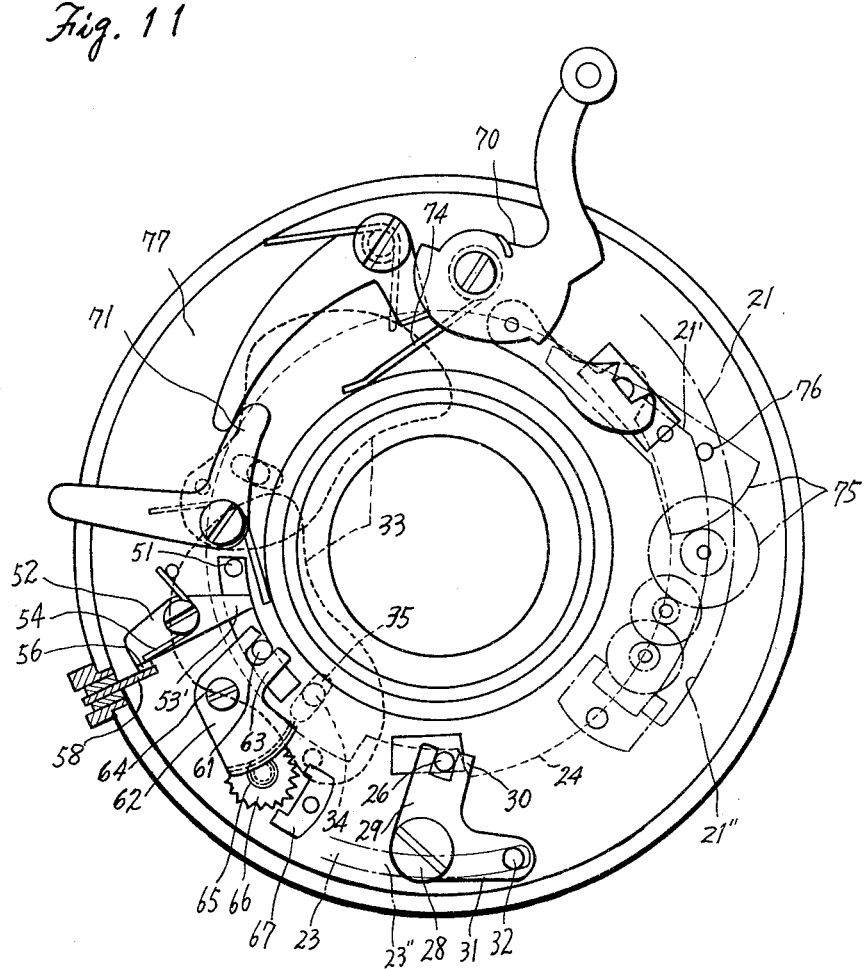
FIG. 11 is a view similar to that shown in FIG. 10 with the shutter open.

Referring to the embodiment shown in FIGS. 6 to 8, a cam 21 for actuating a governor for controlling the amount of engagement of governor 75 (see FIG. 8), or preventing said governor from operating is provided on the exposure controlling plate 22 held rotatably on the front surface of the lens cylinder casing 40. 21' is a cam surface for a decelerating device, said cam surface 21' being preferably caused to limit the operational range of a pin 76 provided on a sector gear. 21'' is a cam groove to hold inoperative the governor 75. On the other hand, the exposure controlling plate 22 is provided with a cam 23 for controlling super-high speed exposure times, a cam surface 23' of the cam 23 being intended for changing overlapping of shutter blades 33 to diminish the diameter of shutter aperture. A cam groove 23'' is formed for avoiding the alteration of blade overlapping in connection with said cam-surface 23'. A blades actuating ring 24 (see FIGS. 6 and 7) is held on a seat 40' in lens cylinder case 40 under the main driving force.

An L-shaped lever 29 for engaging with a pin 26 (FIGS. 6 and 8) fixed to the shutter blade-revolving ring 25 by bifurcated piece 30 is pivoted on seat 40' by a spindle 28; an interlocking bar 32 mounted on one arm 31 of the lever 29 coacts with the cam 23 for the superhigh speed-exposure, time-control provided on said exposure controlling plate 22.

The shutter blades 33 are pivoted on a suitable number of blade revolving spindles 36 arranged on the revolving ring 25 for shutter blades extending through axial holes 36' formed in the base portions of shutter blades. Driving pins 34 of the blade actuating ring 24 are engaged in obliquely extending long holes 35 provided in the shutter blades 33 between said axial holes 36' and the light-controlling parts of the shutter blades. A suitable LV scale 38 is marked adjacent the outer periphery of the surface plate 27 adjacent the exposure controlling plate 22, a pointer 37 on which registers with the respective figures of the scale. The interlocking bar 32 bears upon the cam surface 23' causing the lever 29 to rotate, thereby rotating the shutter blades revolving ring 25 through the bifurcated piece 30 and the pin 26. Therefore, the shutter blades 33, the base portions of which are pivoted upon the revolving ring 25, through the revolving spindles 36, have their relative positions altered by the driving pins 34 of blade driving ring 24 and the driving spindles 36. This is so because the basic portion of each shutter blade is shifted, and the effective operational angles of the blades can be altered.

Synchronization between shutter operation and flash bulb operation is effected by the blade actuating ring 24 through mechanism which will now be described. A pivoted flash bulb actuating lever is formed with two legs 52 and 53 which extend substantially at right angles to each other away from the pivot. The leg 53 has a bifurcated end between the bifurcations of which there is positioned a pin 51 fixed to and extending away from the blade actuating ring 54. Thus, as the blade actuating ring turns, the flash bulb actuating lever is turned by the pin 51. A flash bulb operating switch comprises contacts 56 and 58 carried between the arms of a U-shaped leaf spring which is biased in a direction to bring the contacts 56 and 58 together to complete the circuit through the flash bulb (not shown). When the blade actuating ring 24 is positioned to close the shutter, the flash bulb actuating lever is turned to hold the contacts 56 and 58 apart by means of a pin on the arm 52 which bears upon an arm of the U-shaped leaf spring to separate the contacts. When the blade actuating ring is turned to open the shutter, the bulb actuating lever is turned to move the pin on its arm 52 out of contact with the U-shaped spring which then closes the contacts 56 and 58.

Furthermore, the exposure controlling range can be shifted by changing the effective strength of the main driving means, by either altering the tension of the main spring for the main driving means of the shutter blades or by braking over substantially all of the operational range of the main driving means. The details of said operation will be described in the following. Referring to FIGURES 9 to 11, 70 represents a well-known main driving means; 74 is a main spring stressed in a clockwise direction; 71 is a so-called releasing bar for releasing said main driving means. These constructions are generally well-known and various types thereof are now being used. For this reason, their details are omitted in the drawings.

The cam groove 23'' is adapted for providing a suitable amount of exposure by braking the main driving means 70 or prolonging the operation time at the period of time when said shutter blades come to a substantially maximum exposure by the action of the governor actuating cam 21 provided on exposure-controlling plate 22 as well as the action of related parts for either controlling the engagement of decelerating governor 71 or in-operating said governor, like a known exposure time-controlling method for ordinary shutters.

Thus, the effective operational angle for shutter blades 33 can be altered as described in connection with FIGURES 6 to 8. Opposite the stationary side contact point 58 for flash bulb synchronization (FIGS. 9 to 13) is arranged a contact point 56 at one extremity of the actuating lever 52, as a movable side contact point. The other extremity 53' of said lever 52 is arranged opposite a pin 51 positioned upright on blade driving ring 24. A spring 54 is loaded to revolve the actuating lever 52 in a counter clockwise direction as seen in FIGS. 9 to 13. In the closed condition of shutter blades shown in FIG. 10, pin 51 pushes on the other end 53' of the actuating lever 52 and accordingly contact point 56 is opened. Upon commencement of open and close operation of shutter, the blade actuating ring 24 revolves clockwise, and pin 51 also revolves in the same direction. Then actuating lever 52 revolves counterclockwise under the force of the spring 54, and said movable contact point 56 comes in contact with said stationary contact point 58, assuming the position shown in FIG. 11, and the flash bulb synchronization circuit is closed. By appropriately designing the relation of the pin 51, the actuating lever 52 and the stationary side contact point 58, the switchin can be effected at a desired time with respect to the opening and closing operations of the shutter blades.

Members 61 to 67 are shown, by way of example, as parts of braking means for keeping the strength of main spring 74 for driving means 70 at a value sufficient to perform a stable exposure and to provide a sufficient length of time for opening and closing the shutter blades. Pin 61 is fixed to the blade-driving ring 24, and serves to actuate the brake governor. The pin 61 engages a bifurcated end 63 of a sector gear 62 which is supported by a spindle 64 on the shutter case, said sector gear 62 being in mesh with a pinion 65 coaxially fixed to an escapement 66, said escapement 66 coacting with an anchor 67. The action of the blade-driving ring 24 is controlled by action of said brake governor and thus the operational time of the exposure operation can be chosen at a desired value. Of course, the speed-increase-ratio of the brake governor and the step number of gear are adequately increased according to the desired braking force. It is also possible to produce the same result using an anchor-escapement movement, but by increasing the velocity of a revolving body having suitable inertia. The sound produced by the anchor escapement wheel can thus be reduced together with the smoothness of operation.

Furthermore, if said brake governor is a member which moves in connection with the exposure operation and the action of the shutter blades can also be controlled by controlling the member, the desired purpose can be accomplished by causing the brake to operate in either direction. The blade driving ring 24 is usually arranged on the periphery coaxially with the center of the shutter in the shutter casing, and the pin 61 for engaging the brake governor can be provided at any suitable place in the shutter casing. Generally, the interior of the shutter casing is narrow and it is required to enter mechanisms such as decelerating gear, selftimer, etc., with the result the space occupied by all the mechanisms are limited. Therefore, the engagement of the brake governor with the blade driving ring 24 is very advantageous due to high freedom in the design, and ample safety is obtainable.

Further, in the shutter of the present invention, the controlling range of exposure can also be achieved by using decelerating means of known type, i.e. the governor referred to in the preceding paragraph. The tension of the main spring for the main driving means can be changed or the braking force of the governor, that is, for instance, the anchor can be engaged or disengaged to alter the exposure in the standard operation of exposure, and accordingly, the exposure controlling range can be shifted.

Figure 12:
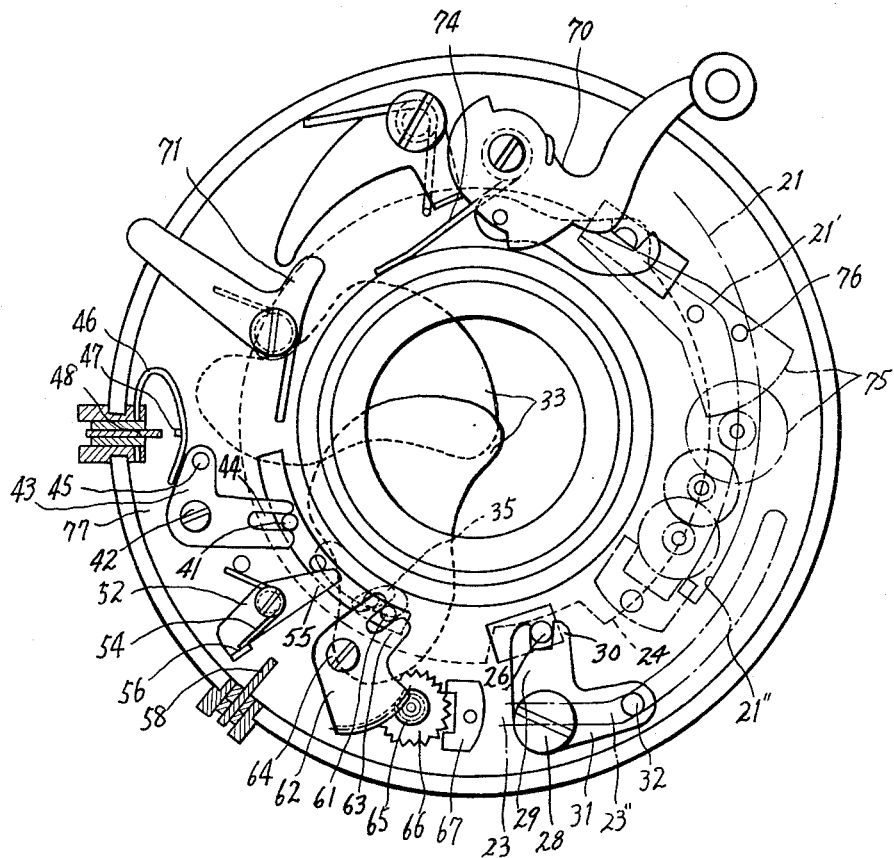
FIG. 12 is a plan view of the embodiment shown in FIGS. 9 to 11, illustrating a contact system, and with the shutter closed.
Figure 13:
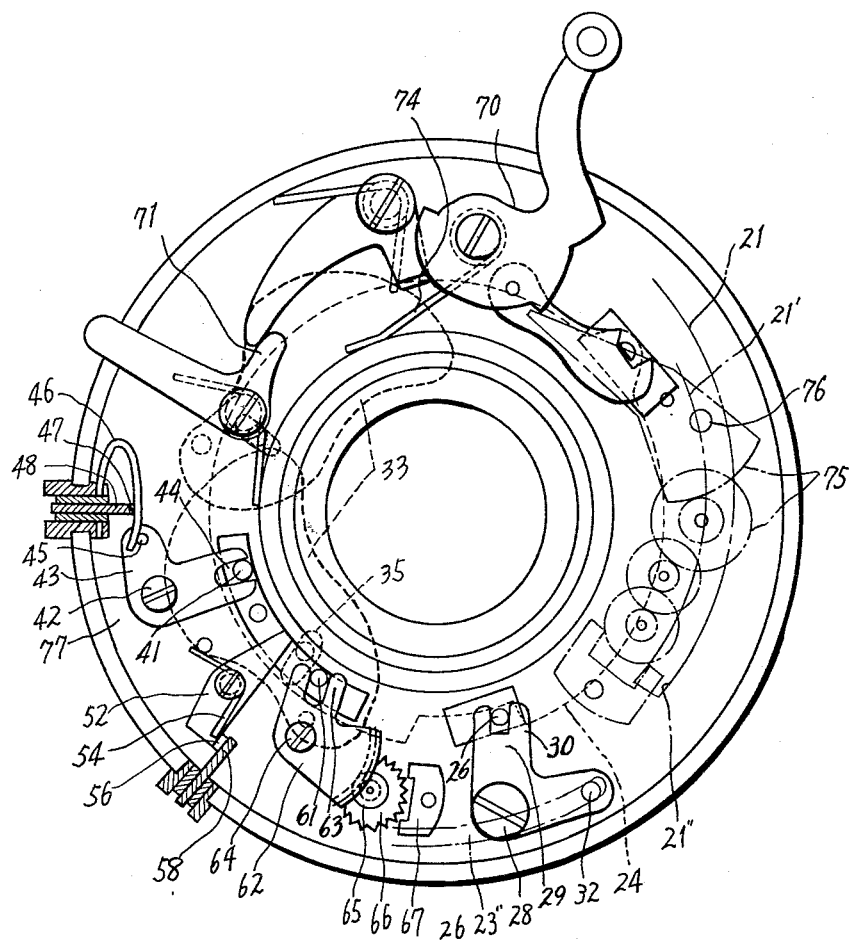
FIG. 13 is a view similar to that illustrated in FIG. 12 showing the shutter open.

When X-contact point is necessary for the flash bulb synchronization, the operation can be effected from outside by the actuating lever 52 attached to a controlling device or by a known device in a contact point method, like the movable contact point 56, which is provided separately in a space 77. Accordingly, as illustrated in FIGS. 12 and 13, the main driving means 70 is operated. Then the blade actuating ring 24 is revolved and pin 41 accompanied by the pin 51 is pivoted with the spindle 42 on the L-shaped lever 43; said pin 41 being engaged by the bifurcated piece 44 of said lever. The L-shaped lever 43 moves with the piece 44, revolving counterclockwise. The pin 45 pushes against the spring 46 at the terminal side, and then the contact point 47, coming in contact with the contact point 38 of the terminal closes the circuit for the X-contact point-flash bulb synchronization. FIG. 12 represents the case wherein the shutter is closed; and FIG. 13 represents the case wherein the shutter is released.

What I claim is:

1. A camera lens shutter comprising, a lens casing, a plurality of overlapping shutter blades disposed within the lens casing in a plane perpendicular to the longitudinal axis of the lens for exercising the functions of shutter and diaphragm, the shutter blades having obliquely extending holes therethrough, driving means including an actuating ring disposed in a plane parallel to the plane of the shutter blades for opening and closing said shutter blades with a constant force, driving pins fixed to the actuating ring extending through the holes in the blades to open and close said blades, means for regulating the overlap of the shutter blades when closed, a single releasing bar for releasing the driving means extending therefrom out of the lens casing, a separate pin fixed to the actuating ring and a brake governor operatively connected to the separate pin for actuation thereby to decelerate movement of the blade actuating ring as the shutter blades are fully opened thereby.

2. A camera lens shutter according to claim 1 wherein said means for regulating the overlap of said shutter blades includes a shutter blade revolving ring disposed in a plane parallel to the planes of said shutter blades, and blade revolving spindles pivoting said blades to said shutter blade revolving ring.

3. A camera lens shutter according to claim 2 wherein said means for regulating the overlap of said shutter blades comprises a pin fixed to said shutter blade revolving ring, an L-shaped lever disposed in a plane parallel to that of said shutter blade revolving ring pivoted adjacent said shutter blade revolving ring engaging said pin at one end of said lever, an interlocking bar fixed to the other end of said lever and extending therefrom parallel to the axis of the pivot of said lever, and a revolvable control plate at the front of the camera having a cam therein, said interlocking bar extending into contact with the cam in said control plate, whereby revolving said control plate turns said shutter blade revolving ring to shift the position of said shutter blades with respect to said respective driving pins to change the effective operational angle of said blades.

4. A camera lens shutter according to claim 2 wherein a pin is fixed to said blade actuating ring and a flash bulb switch is operated by said pin, whereby the time required for full open aperture of said shutter blades may be synchronized with the flash of the flash bulb.

5. A camera lens shutter comprising a plurality of overlapping shutter blades disposed in a plane perpendicular to the axis of the camera lens for exercising the functions of shutter and diaphragm, driving means of constant force for opening and closing said shutter blades, means for regulating the overlap of said blades when closed, a single releasing bar for releasing said driving means extending therefrom to the outside of the camera, and a flash bulb switch operatively associated with said driving means to be closed by said driving means as said shutter blades are fully opened thereby.

6. A camera lens shutter comprising a plurality of overlapping shutter blades disposed in a plane perpendicular to the axis of the camera lens for exercising the functions of shutter and diaphragm, driving means of constant force for opening and closing said shutter blades, means for regulating the overlap of said shutter blades when closed, and a single releasing bar for releasing said driving means extending therefrom out of said lens shutter, in combination with an exposure meter in fixed position relatively to the camera, a follower pointer of said exposure meter, and a connection between said driving means of the shutter and said follower pointer whereby said driving means may be set in accordance with the showing of said light meter.

References Cited in the file of this patent

UNITED STATES PATENTS

| | | |
|---|---|---|
| 382,858 | Bausch | May 15, 1888 |
| 436,404 | Dallmeyer | Sept. 16, 1890 |
| 524,670 | Rudolph | Aug. 14, 1894 |
| 761,756 | Brueck | June 7, 1904 |
| 798,595 | Brueck | Sept. 5, 1905 |
| 2,343,690 | Mihalyi | Mar. 7, 1944 |
| 2,371,072 | Simmon | Mar. 6, 1945 |
| 2,522,699 | Willcox | Sept. 19, 1950 |
| 2,868,095 | Gebele | Jan. 13, 1959 |
| 2,878,737 | Clark | Mar. 24, 1959 |
| 2,920,542 | Engelsmann | Jan. 12, 1960 |
| 2,969,007 | Groger | Jan. 24, 1961 |